Figure 4:
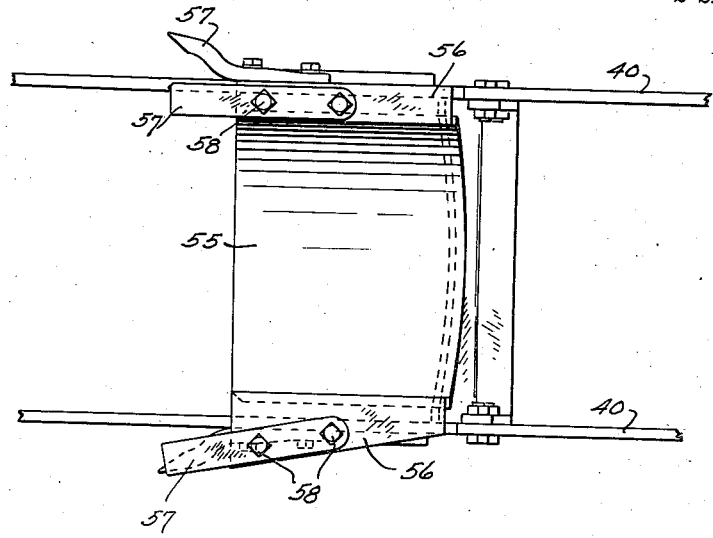

Nov. 11, 1941.                P. R. HALBERT                 2,261,997
                            EXCAVATING MECHANISM
                            Filed Oct. 4, 1940              2 Sheets-Sheet 1
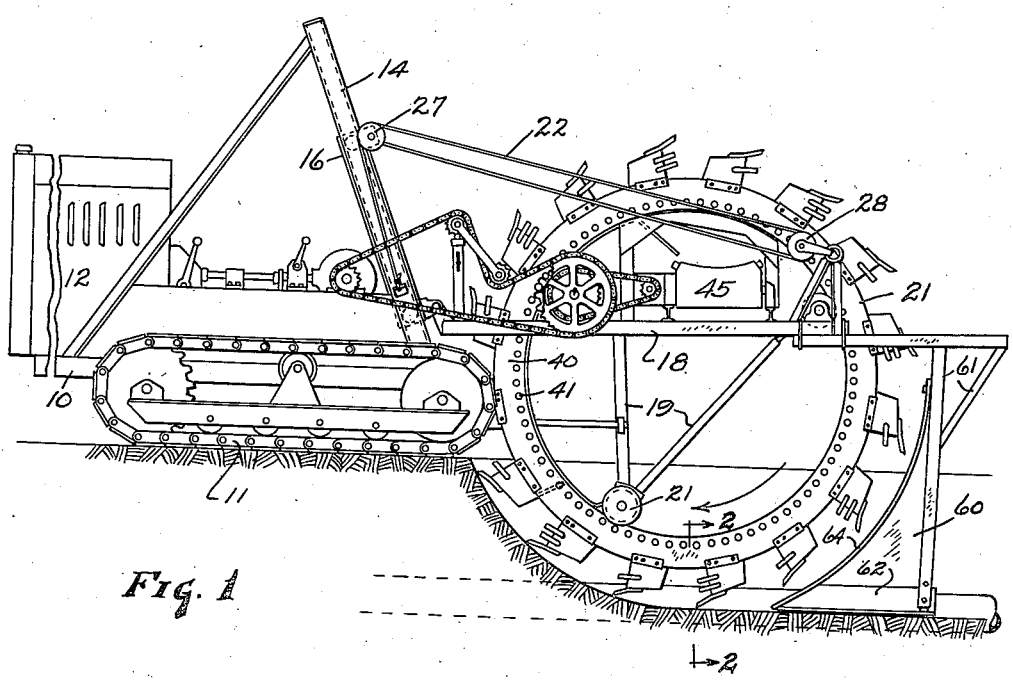
Fig. 1
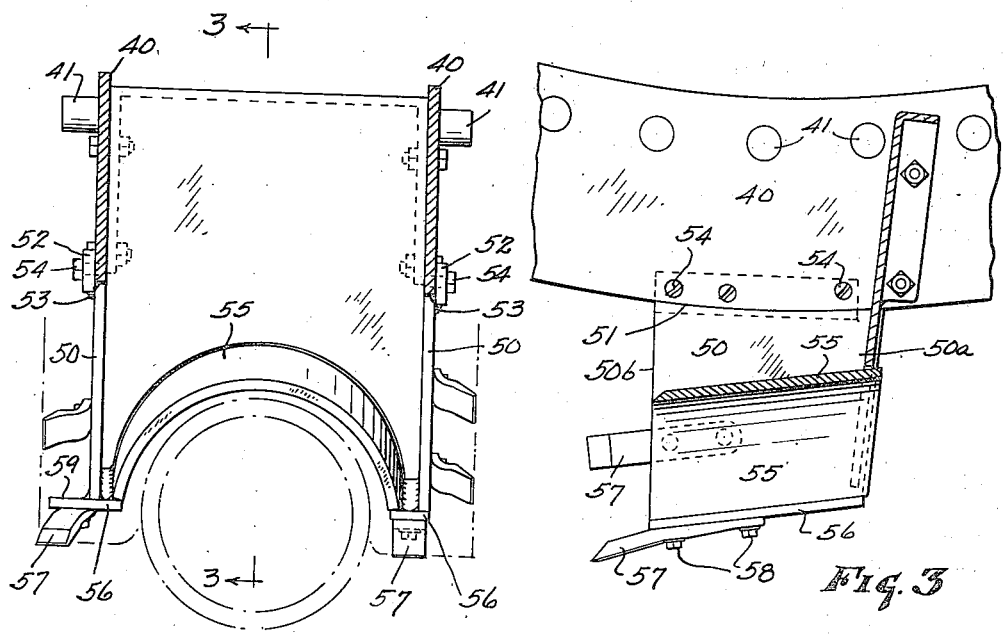
Fig. 2
Fig. 3
INVENTOR.
Paul R. Halbert
BY Bates Teare & McBean
ATTORNEYS.

Nov. 11, 1941.   P. R. HALBERT   2,261,997
EXCAVATING MECHANISM
Filed Oct. 4, 1940   2 Sheets-Sheet 2

INVENTOR.
Paul R. Halbert
BY Bates, Teare & McBean
ATTORNEYS.

Patented Nov. 11, 1941

2,261,997

UNITED STATES PATENT OFFICE 2,261,997

EXCAVATING MECHANISM

Paul R. Halbert, Dallas, Tex., assignor to The Cleveland Trencher Company, Cleveland, Ohio, a corporation of Ohio Application October 4, 1940, Serial No. 359,702

5 Claims. (Cl. 37—97)

This invention relates to a trenching machine and more particularly to an excavating mechanism for a trenching machine. The invention is especially concerned with an improved digging or excavator bucket for a trenching machine excavating unit. These, therefore, are the general objects of the present invention.

Trenching machines of the general type with which the present invention is concerned are used for excavating trenches to receive underground conduits such as water, gas and electric pipe and conduit lines. Sometimes it is desirable to use such machines to uncover previously laid conduits to facilitate the making of repairs or replacements.

In the past, considerable difficulty has been encountered when unearthing previously laid conduits. It has been the custom to partially reexcavate the trench by machine, leaving three to six inches of earth over the conduit, and then remove the remaining earth by a hand operation. Changing surface contours, shifting earth conditions, and the like sometimes cause the depth of the conduit or pipe line from the surface to differ from the original depth. Likewise, unforeseen obstructions, soil conditions, and the like, encountered in digging the original trench may have caused the conduit to be laid higher or lower than intended. These, together with the fact that accurate records are seldom kept of such changes, make it difficult to approach the conduit during reexcavation, by machine digging operations without danger of contacting the pipe or conduit with the digging units. Such contact frequently damages or destroys the conduit. In the past this possible damage to the conduit has caused the shut down of the service of the conduit before the reexcavation operations were started. Likewise, in the past, the methods used in machine digging left much of the conduit or pipe line partially covered after the machine digging operation had been completed. Likewise, it has been difficult to insure the accurate following of the conduit or pipe line with the machine during reexcavation. Hence, the machine operations have had to be slowed up to enable manual digging or cleaning up operations to keep pace therewith.

The disadvantages above pointed out have made the reexcavation of previously laid conduits or pipe lines a slow and expensive operation, far out of line with present day costs of laying new conduit. Indeed, in some areas new lines have been laid and old lines abandoned, because of this excessive cost. However, in metropolitan or congested areas, old conduits sometimes have to be removed to provide for space for the new conduits. The general object of the present invention is to provide a trenching machine which will economically reexcavate a trench to expose, for removal or repair, a previously laid conduit or pipe line, and which trenching machine will be so arranged to enable the digging operation to be completed by machine without damage to the conduit or pipe line, whereby the line may remain in service during the trenching operation.

A further object of the present invention is to provide an excavating unit or wheel for a trenching machine, which excavating unit will remove sufficient earth from a conduit or pipe line as to enable the removal of said line without requiring hand digging.

Another object of this invention is to provide an improved digging bucket for a trenching or excavating machine which bucket will remove earth from a pipe line and from the sides thereof and yet which will have comparatively great strength to enable it to cut through roots, hard soil, and the like, over prolonged periods of use.

Other objects and advantages of the present invention will become more apparent from the following description, reference being had to the accompanying drawings in which a preferred embodiment of the invention is shown. The essential features of the invention will be summarized in the claims.

Figure 5:
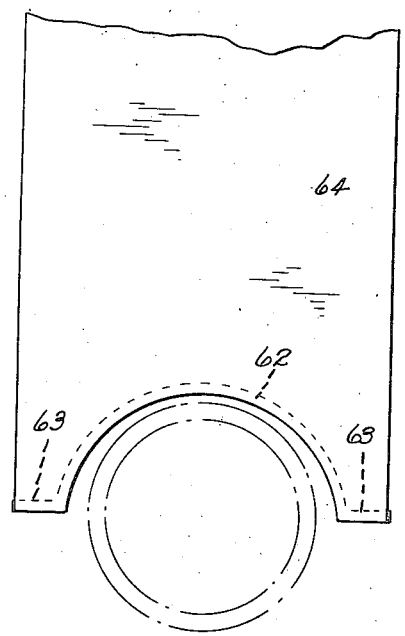

Referring now to the drawings, Fig. 1 illustrates a trenching machine having my improved digging unit incorporated thereon and illustrates the improved digging bucket in side elevation; Fig. 2 is a front elevation on an enlarged scale of my improved bucket as indicated by the lines 2—2 on Fig. 1; Fig. 3 is a sectional view of substantially the same scale as Fig. 2, the plane of the section being indicated by the line 3—3 on Fig. 2; Fig. 4 is a bottom view of the bucket, and Fig. 5 is an enlarged front elevation of the crumbing shoe.

The trenching machine connection with which I have illustrated my invention is that described and shown in an application for Letters Patent, Serial No. 299,306, filed October 13, 1909, and which is assigned to The Cleveland Trencher Company, and reference may be had to such application for a more complete description of such machine.

Briefly, the trenching machine comprises a frame 10 which is supported by a pair of spaced tractor belts, one of which is shown in Fig. 1 at 11. The forward end of the frame 10 supports a motor or power plant 12 which is drivingly connected to the tractor belts to propel the machine at the desired speed. The rear end of the frame 10 is provided with an upwardly extending forwardly inclining guideway 14, the lower end of which is suitably secured to the frame 10. A carriage 16 is mounted for sliding movement longitudinally of the guideway and is raised and lowered therein by any suitable means carried by the frame 10 and driven from the motor 11. Pivotally secured to the carriage as at 17 is a digging unit frame 18 which extends rearwardly in a substantially horizontal direction from the carriage. This frame carries supports 19 which are provided with flanged rollers, one of which is illustrated or shown at 20 in Fig. 1, and which are arranged to engage and rotatively support a digging wheel 21. The wheel 21 is rotated by the motor 11 through a suitable power transmission and driving mechanism.

The outer end of the frame 17 is supported by a pair of cables, one of which is indicated at 22. This cable is secured to the guideway 14, and passes upwardly around a sheave 27 mounted on the carriage 16 to a sheave 28 which is pivotally connected to the outer end of the digging unit frame 18. The cable is looped around the sheave 28 and passes back to the carriage to which it is secured in any suitable manner. The cable is of such length to support the digging unit frame substantially horizontal when the carriage and frame are in their lower position as indicated in Fig. 1. The mechanism for lowering and raising the carriage to position the digging wheel may be of any suitable type. However, reference may be made to the copending application heretofore mentioned, where a complete disclosure of a suitable mechanism is described.

The digging unit with which the present invention is particularly concerned, is shown as being a wheel-type unit. This wheel comprises a pair of spaced rings 40, the inner periphery of which are engaged and supported by the flanged rollers 21 heretofore mentioned. Each ring is provided with a set of gear teeth in the nature of outwardly extending pins 41, arranged to coact with a gear carried by the frame 18 to drive the wheel in the direction of the arrow indicated in Fig. 1. The arrangement of this gear formation and driving mechanism is more clearly shown and described in the copending application heretofore referred to. The two rings 40 are, as hereinafter will become more apparent, secured together and maintained in spaced relationship by the digging buckets themselves.

The buckets which are spaced about the periphery of the digging wheel carry the removed earth to the upper portion of the wheel where it falls onto a suitable belt conveyor 45 which carries the earth to the side of the trench. A more complete disclosure of a conveyor mechanism suitable for this purpose will be found in the copending application heretofore referred to.

Each digging bucket comprises a pair of side plates 50, the upper edges 51 of which are arcuately shaped to engage the outer periphery of respective digging wheel ring 40. A bar 52 is welded to each side plate 50, as at 53, and overlies the junction between the ring and side plate. This bar is secured to the ring by bolts 54, the bolts being countersunk in the inner surface of the respective wheel rings and extending through both the ring and bar.

The bottom of the bucket is formed by concave or inwardly bent steel plate 55 which is joined to the side plates by a pair of flat plate members 56, the latter being welded to both the bottom plate and the respective side plate. This construction provides a formation which removes the earth not only from above the conduit, but also from the sides thereof, and likewise provides an extremely rigid bucket having a minimum cross sectional area of metal. The bottom plate is indicated in Fig. 2 as having a greater radius of curvature than the conduit to be uncovered, and as extending substantially to a horizontal plane passing through the axis of the conduit.

The side plates 50 and the bottom plates 56 are provided with rooters 57 which cut clearances for the wheel. These rooters comprise sharpened bars and are secured to the outer surface of the bucket by bolts 58, the heads of which are countersunk in the bucket wall. It will be noted from Fig. 2 that the left hand plate 56 extends outwardly beyond the side wall of the bucket as indicated at 59, and the rooter carried thereby extends diagonally outward. This is a decided advantage as it provides a rigid support for such rooter and loosens the earth from the corners of the trench and permits removal of the same. The opposite or right hand bottom plate 56 terminates at the side wall of the bucket. These buckets are made right and left handed in this regard to assure cutting of both corners of the trench and are accordingly alternately arranged about the periphery of the cutting wheel.

It will be noted from Fig. 3 that the rearmost portion 50a of the side plate 50 extends outwardly from the periphery of the ring a distance less than the forward or cutting portion 50b thereof, thus causing the bottom of the bucket to incline rearwardly toward the periphery of the ring. This provides an increased clearance between the rear portion of the bucket bottom 55 and the conduit being uncovered and prevents the crushing of the conduit due to falling materials which might otherwise become lodged between the bottom of the bucket and the conduit.

To remove any material which may fall into the trench, as for instance, such material as may overflow the conveyor 70, there is preferably provided crumbing shoe 60. This shoe is carried by structural members 61 which depend from the wheel carrying frame 18. The crumbing shoe comprises, as shown in Fig. 5, an arcuately shaped bottom plate 62, terminating at its sides in substantially horizontal flanges 63, thus is shaped substantially to conform to the cross section of the bottom of the bucket. The shoe is provided with an arcuately shaped face plate 64 which conforms in contour to the digging wheel and which is secured at its upper end to a member 61 and at its lower end to the forward edge of the bottom wall 62 of the shoe. The shoe thus serves to shove all material not removed from the trench by the buckets into the path of a downwardly moving bucket.

I claim:
1. A digging bucket for a trenching machine, said bucket comprising a pair of side walls joined together at their bottom edges by a bottom wall which is deformed inwardly to extend into the space between the side walls.
2. A digging bucket for a trenching machine, said bucket comprising a pair of spaced side plates and a concave bottom plate joined to the bottom edges of the side plates by a pair of flat plate members.

3. A digging bucket for a trenching machine, comprising a pair of side walls and an inverted U-shaped bottom wall having the legs of the U secured to the bottom edges of the side walls by flat plate members.

4. A digging bucket comprising a pair of side plates adapted to be secured to spaced rings of a digging wheel and extending outwardly therefrom, said walls having their bottom edges sloping inwardly from front to rear toward the periphery of the digging wheel, and a bottom wall comprising a plate having one edge secured to one side wall and extending inwardly and upwardly therefrom and thence downwardly and outwardly to join the bottom edge of the other side plate.

5. A digging bucket comprising a pair of side plates adapted to be secured to spaced rings of a digging wheel and extending outwardly therefrom, said walls having their bottom edges sloping inwardly from front to rear toward the periphery of the digging wheel, a pair of spaced flat plate members welded to the bottom edge of respective side plates and extending inwardly therefrom, and a bottom wall comprising a plate having one edge welded to one offset spaced plate and being bent inwardly and upwardly then downwardly and outwardly, and having its opposite edge welded to the other spaced plate member.

PAUL R. HALBERT.